US005454268A

United States Patent [19]

Kim

[11] Patent Number: 5,454,268

[45] Date of Patent: Oct. 3, 1995

[54] DOUBLE-PLUNGER LIQUID DISPLACEMENT SYRINGE PIPET

[76] Inventor: Young S. Kim, 208 Midland Ave., Wayne, Pa. 19087

[21] Appl. No.: 152,839

[22] Filed: Nov. 15, 1993

[51] Int. Cl.$^{6}$ ........ G01N 1/14

[52] U.S. Cl. ........ 73/864.01; 73/864.13; 422/100

[58] Field of Search ........ 73/864.01, 864.13, 73/864.16, 864.24; 422/100

[56] References Cited

U.S. PATENT DOCUMENTS

| | | | |
|---|---|---|---|
| 4,023,716 | 5/1977 | Shapiro | 73/864.13 |
| 4,036,064 | 7/1977 | Hydo | 73/864.17 |
| 4,333,458 | 6/1982 | Margulies et al. | 604/220 |
| 4,672,857 | 6/1987 | MacDermott | 73/864.18 |

FOREIGN PATENT DOCUMENTS

| | | | |
|---|---|---|---|
| 14120 | 8/1980 | European Pat. Off. | 73/864.13 |
| 153058 | 8/1985 | European Pat. Off. | 422/100 |
| 455043 | 11/1991 | European Pat. Off. | 422/100 |
| 2495317 | 6/1982 | France | 422/100 |
| 2534705 | 2/1977 | Germany | 73/864.13 |
| 2711124 | 9/1978 | Germany | 73/864.13 |
| 229941 | 11/1985 | Germany | 422/100 |
| 257341 | 11/1991 | Japan | 73/864.13 |
| 964461 | 10/1982 | U.S.S.R. | 73/864.01 |
| 1662676 | 7/1991 | U.S.S.R. | 422/100 |
| 8700085 | 1/1987 | WIPO | 422/100 |

*Primary Examiner*—Hezron E. Williams
*Assistant Examiner*—Daniel S. Larkin

[57] ABSTRACT

A device is described which measures and dispenses accurate and reproducible volumes of normal, viscous, or low density organic liquid. The device consists of a rigid cylindrical tube containing a main coil spring which makes the core shaft move, a double-plunger attached on the low end of the core shaft, and a syringe barrel attached securely on the low end of the cylindrical tube. The coil spring is supported by the lower end plug through which the core shaft moves. This double-plunger system should measure liquid volumes accurately without air space between the liquid and the plunger, and deliver completely without leaving any residual liquid in the syringe barrel.

5 Claims, 2 Drawing Sheets

FIG. 2A
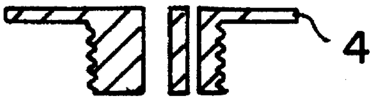
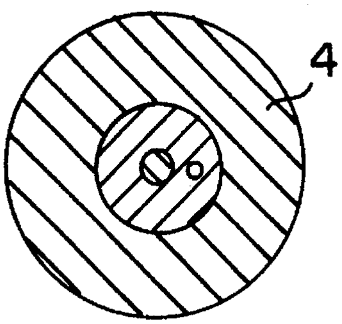
FIG. 2B
FIG. 3A
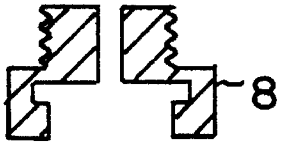
FIG. 3B
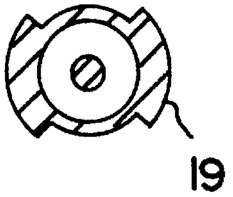
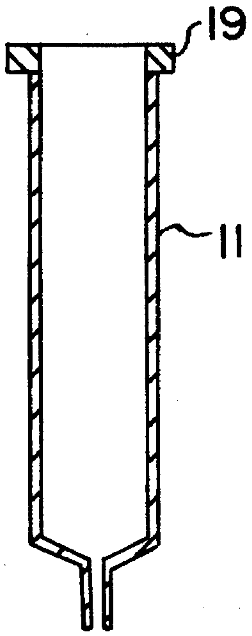
FIG. 3C

DOUBLE-PLUNGER LIQUID DISPLACEMENT SYRINGE PIPET

BACKGROUND OF THE INVENTION

1. Field of the Invention

The present invention relates to a device for measuring and dispensing volumes of a liquid such as viscous solutions, suspension, or low density organic solutions accurately, reproducibly and quickly. More specifically, the present invention relates to a double-plunger syringe-type device which measures and dispenses liquid volumes without having air space between the plunger and the liquid.

2. Prior Art

Often in liquid volume measuring and dispensing for analytical sampling, a volume greater than one milliliter is required for accurate samplings (e.g. 5.0 ml or 10.0 ml). All of the prior art of positive displacement syringe pipets deliver less than one milliliter of liquid volume, with the exception of the pipet in U.S. Pat. No. 4,023,716, which dispenses a maximum volume of one ml of liquid. The pipet in the U.S. Pat. No. 4,023,716, however, suffers due to the large contacting surface of the syringe plunger with the inner surface of the syringe barrel and tip; it fails to deliver a liquid completely and accurately. Also, the syringe barrel is snapped weakly onto the main body of the device, and so it is easily snapped off from the body of the device during the delivery of a liquid sample in the barrel. The accuracy also varies due to the shifting positions of the adjustable plunger shaft; accordingly, frequent adjustment is required. U.S. Pat. No. 4,672,657 (McDermott) does not use a double-plunger liquid displacement system and it is only for the purpose of measuring micro volumes of liquid. U.S. Pat. No. 4,036,064 (Hydo) uses a system for mixing a reagent and a sample in a syringe barrel by a three-step operation and the inner plunger does not reach the end of the syringe tip for a complete delivery of a solution. U.S. Pat. No. 4,333,458 (Margulier) describes a system for a direct injection of an injectable solution from a glass cartridge ampule by a large plunger which holds the cartridge and a small rod which has an arrow tip engaging to the rubber plug of the cartridge ampule. These plungers do not contact with the solution. No current device is known to measure and dispense liquid volumes with a double-plunger syringe-type pipet, or with a firm and secure syringe barrel mounting mechanism (such as a bayonet mounting mechanism).

SUMMARY OF THE INVENTION—OBJECTS AND ADVANTAGES

The principle object of the present invention is to provide a device for measuring and dispensing viscous, suspension, or low-density organic liquids accurately, consistently, and quickly. It is also an object of the present invention to provide a device which has a double-plunger syringe type of liquid dispenser. Another object is to provide a device which uses a firm and secure syringe barrel attachment mechanism. A further object of the present invention is to provide for the delivery of larger volumes (more than 1.0 ml) of viscous solutions quickly and accurately.

In the preferred embodiment of the invention, a rigid, tubular main body contains a main plunger shaft and a main coil spring which move the plunger to a predetermined distance in the syringe barrel. The main coil spring is sustained by the low end support which also holds firmly the syringe barrel by, for example, a bayonet mechanism. At the low end of the plunger shaft the double-plunger is connected to the shaft by means of a screw-connecting mechanism. The main plunger consists of the outer hollow plunger and inner plunger which slide up and down in the main shaft. When the main plunger reaches the bottom of the syringe barrel, the inner plunger pushes out the remaining liquid in the tip of the syringe barrel cleanly and completely.

BRIEF DESCRIPTION OF THE DRAWINGS

FIG. 1-B is a detailed cut view of the inner structure of the double-plunger syringe system of the device. FIG. 2 shows a cut-view of the top plug of the main body. FIG. 3 shows the mechanism of the bayonet mount structure for attaching the disposable syringe barrel. The main body of the device in FIG. 1-A shows the top plug of the main body of the device and calibration screw position.

DETAILED DESCRIPTION

Figure 1A:
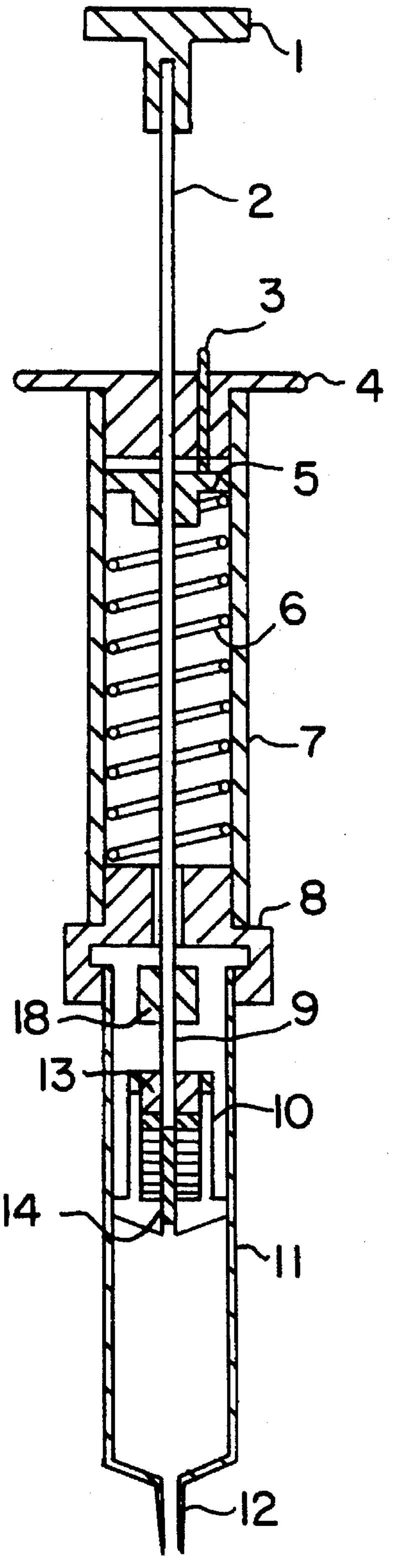
FIG. 1-A is a vertical cut-view of a whole system of the device in accordance with the present invention.
Figure 1B:
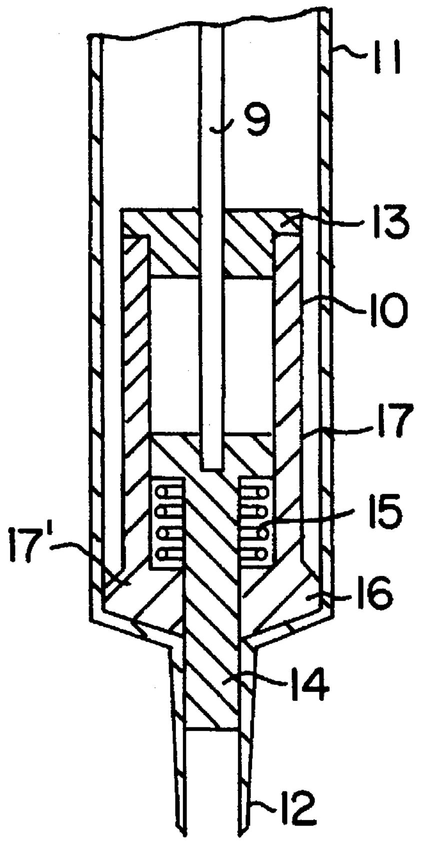

As shown in the drawings, the preferred double-plunger liquid displacement syringe pipet device in accordance with the present invention includes: a main body(7), which consists of the main steel plunger shaft(2) which slides up and down through the top metal plug(4) which is screw mounted on top of the main body(7), and the lower end support(8) which has a firm attaching system for the syringe barrel. The sliding motion of the main shaft(2) and the plunger(10) is initiated by hand. The main shaft(2) can be stopped by the metal bushing(5) which is fixed on a predetermined position on the main shaft according to the predetermined volume to be measured and dispensed. Also, the accurate position which determines the accurate volume of liquid can be calibrated by adjusting the screw(3) on the upper plug(4). The top end of the main shaft(2) has a flat top(1) and the lower end of the shaft has a connecting screw(18) to connect the plunger shaft(9). The low end metal plug(8) is screw-mounted to the main body(7) and has a firm mounting mechanism; for example, a bayonet mount for the syringe barrel(11), as shown in FIG. 1. Preferably, all of the main body parts are made with a light-weight metal such as aluminum alloy except the springs and the plunger shaft. FIG. 1-B shows the detailed construction of the double-plunger system of the present invention which consists of the main plunger(10) and the inner plunger(14) which is connected directly to the plunger shaft(9) and is stopped by the top plug(13) of the main plunger(10). The hollow structure of the main plunger(10) contains the inner plunger(14) and inner coil spring(15) which is stronger than the main spring(6) so that the inner spring(15) is not compressed and the inner plunger(14) is not pushed down until the main plunger(10) reaches the bottom of the syringe barrel(11), as shown in FIG. 1-B. In other words, the inner plunger(14) should not be pressed down until the bottom surface of the main plunger(10) contacts completely with the bottom inner surface of the syringe barrel(11). After the main plunger(10) reaches the bottom of the syringe barrel(11), the inner plunger(14) will be pushed down, and it will push out the liquid in the tip of the syringe barrel(12) by further pushing the main shaft(2). The plunger material could be a strong and inert plastic, for example Teflon. This two-step action of the double-plunger should deliver the liquid in the syringe barrel(11) completely without leaving any residual liquid in the barrel(11). There will be no air gap between the plunger(14) and liquid to be measured. The diameter of the contacting part of the main plunger front(16) should be slightly larger than the inner diameter of the syringe barrel(11) so that any type of liquid will be swept out completely. The diameter of the inner plunger(14) should be exactly the same as the inner diameter of the syringe barrel tip(12).

The shape of the syringe barrel is similar to a regular syringe barrel. However, it has a secure mounting mechanism on the low end support(8) which has a bayonet mounting structure(19). This mounting mechanism secures and maintains the accuracy of the plunger action which measures and delivers accurate liquid volumes.

The internal structure of the tip of the syringe barrel is straight; however, the outside of the tip has a tapered end so that a regular syringe-needle hub can be attached. There are two metal washers(17',17), as shown in the FIG. 1-B, to protect from wear. FIG. 1-B shows the inner plunger at the half-pressed state while FIG. 1-A shows the inner plunger at resting state.

In use, the main plunger and inner plunger should be pushed down to the tip of the syringe barrel. While maintaining the tip of the syringe barrel in a liquid sample and avoiding any air bubbles on the tip, the main shaft should be released slowly to fill the syringe barrel. Then, excess liquid on the outer tip of the barrel should be wiped clean with, for example, a piece of tissue paper. The liquid in the syringe barrel would be delivered into another container by gently pushing down the main shaft until the inner plunger reaches the end of the syringe barrel. The last drop of liquid on the tip should be shaken off by contacting it on the wall of the receiving container.

An accurate calibration can be performed, for example, by filling the syringe barrel with pure water at 25° C. as described in the use. Then, the weight of the water is measured accurately by delivering the water into a small glass vial on a balance pan. The volume of the water at 25° C. can be calculated by dividing the weight of water with the density of water, which is 0.99707 gm/ml. The calibration can be made by the calibration screw located on the top plug of the main body (FIG. 1). The calibration screw restricts the traveling distance of the plunger in the syringe barrel.

SUMMARY AND RAMIFICATIONS

This invention is a syringe-type pipet which has a double-plunger and disposable syringe barrel having a main barrel and a delivery tip section. The main plunger dispenses the liquid from the main barrel and the inner plunger delivers the liquid from the tip section of the syringe barrel. The double-plunger travels consecutively in the conduit, and it delivers an accurate liquid volume. To take a liquid volume into the syringe barrel, the double-plunger acts exactly in the reverse way, without taking any air into the syringe barrel.

Although the description above contains only a few examples of the specifications, these should not be construed as limiting the scope of the invention but as merely providing illustrations of some of the presently preferred embodiments of this invention. For example, a single device can be used as a variable-volume dispensing device by means of the variable restriction of the traveling distance of the double-plunger in the syringe barrel (which could deliver, for example, 1, 2, 3, 4, or 5 ml of liquid from a 5 ml capacity device).

Thus, the scope of the invention should be determined by the appended claims and their legal equivalents, rather than by the examples given.

I claim:

1. A device to measure and deliver accurate volumes of viscous or low density liquids reproducibly comprising a) a rigid cylindrical tube body having a core shaft adapted to slide through the body, b) a main coil spring which serves to move a double-plunger attached to the low end of said core shaft, c) a disposable syringe barrel, wherein said double-plunger consists of a main plunger adapted to deliver liquid from said disposable syringe barrel and a inner plunger adapted to extend through a cylindrical opening in said main plunger as said main plunger contacts the bottom of said disposable syringe barrel in a continuous one step operation.

2. The device in claim 1 wherein said rigid cylindrical tube body has a top end plug through which said core shaft slides and has a screw adjustable for volume calibration.

3. The double-plunger in claim 1 wherein said inner plunger is attached to the low end of said core shaft and retracts through the use of an inner coil spring in said main plunger as pressure on said core shaft is released.

4. The double-plunger in claim 3 wherein said inner coil spring is stronger than said main coil spring so as to prevent said inner plunger from sliding out of said main plunger before the bottom of said main plunger is reached the bottom of said disposable syringe barrel.

5. The device in claim 1 wherein said disposable syringe barrel has an extended narrow delivery tip adapted to receive said inner plunger and bayonet means for mounting said disposable syringe barrel to the bottom of said cylindrical tube body.

* * * * *